US006989234B2

(12) United States Patent
Kolar et al.

(10) Patent No.: US 6,989,234 B2
(45) Date of Patent: *Jan. 24, 2006

(54) METHOD AND APPARATUS FOR NON-CONTACT ELECTROSTATIC ACTUATION OF DROPLETS

(75) Inventors: Pramod Kolar, Durham, NC (US); Richard B. Fair, Durham, NC (US)

(73) Assignee: Duke University, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/253,372

(22) Filed: Sep. 24, 2002

(65) Prior Publication Data

US 2004/0055536 A1    Mar. 25, 2004

(51) Int. Cl.
| | |
|---|---|
| C12Q 1/68 | (2006.01) |
| C12M 1/36 | (2006.01) |
| G01N 15/05 | (2006.01) |
| B01L 3/02 | (2006.01) |

(52) U.S. Cl. .......................... 435/6; 435/7.1; 435/174; 435/283.1; 435/287.2; 435/288.2; 435/288.5; 422/68.1; 422/100

(58) Field of Classification Search .................. 435/6, 435/7.1, 174, 283.1, 287.2, 288.2, 288.5, 435/422; 422/68.1, 100
See application file for complete search history.

(56) References Cited

U.S. PATENT DOCUMENTS

| | | | |
|---|---|---|---|
| 5,468,374 A | 11/1995 | Knoll | 210/96.2 |
| 5,911,533 A | 6/1999 | Fassler et al. | 401/195 |
| 5,921,678 A | 7/1999 | Desai et al. | 366/336 |
| 5,980,719 A | 11/1999 | Cherukuri et al. | 204/600 |
| 6,057,149 A | 5/2000 | Burns et al. | 435/287.2 |
| 6,086,243 A | 7/2000 | Paul et al. | 366/273 |
| 6,109,717 A | 8/2000 | Kane et al. | 347/12 |
| 6,110,426 A | 8/2000 | Shalon et al. | 422/68.1 |
| 6,130,098 A | 10/2000 | Handique et al. | 436/180 |
| 6,136,212 A | 10/2000 | Mastrangelo et al. | 216/49 |
| 6,154,226 A | 11/2000 | York et al. | 346/140.1 |
| 6,170,981 B1 | 1/2001 | Regnier et al. | 366/336 |
| 6,211,477 B1 | 4/2001 | Cardott et al. | 209/127.4 |

(Continued)

OTHER PUBLICATIONS

Fair, R. "Non-contact electrostatic stamping for DNA microarray synthesis" SmallTalk, 2001, pp. 139.*

(Continued)

Primary Examiner—BJ Forman
(74) Attorney, Agent, or Firm—Jenkins, Wilson & Taylor, P.A.

(57) ABSTRACT

An apparatus for actuating a droplet comprises a first conductive layer, a second conductive layer, a conductive elongate element, and a voltage source. The first conductive layer comprises a first hydrophobic surface. The second conductive layer comprises a hydrophilic surface facing the first hydrophobic surface. The second conductive layer is axially spaced from the first conductive layer to define a gap therebetween. The conductive medial element is disposed in the gap between the first and second conductive layers, and comprises a second hydrophobic surface. The voltage source communicates with the second conductive layer and the elongate element. By applying a voltage potential between the elongate element and the second conductive layer, droplets can be electrostatically actuated so as to move from the first conductive layer into contact with the second conductive layer. The apparatus is particularly useful in the synthesis of microarrays of biological, chemical, or biochemical samples.

29 Claims, 6 Drawing Sheets

U.S. PATENT DOCUMENTS

| | | | |
|---|---|---|---|
| 6,213,151 B1 | 4/2001 | Jacobson et al. | 137/827 |
| 6,231,177 B1 | 5/2001 | Cherukuri et al. | 347/105 |
| 6,294,063 B1 | 9/2001 | Becker et al. | 204/450 |
| 6,318,970 B1 | 11/2001 | Backhouse | 417/92 |
| 6,352,838 B1 | 3/2002 | Krulevitch et al. | 435/34 |
| 6,379,929 B1 | 4/2002 | Burns et al. | 435/91.2 |
| 6,559,474 B1 * | 5/2003 | Craighead et al. | 257/40 |
| 6,565,727 B1 | 5/2003 | Shenderov | |
| 6,773,566 B2 * | 8/2004 | Shenderov | 204/450 |
| 2002/0043463 A1 | 4/2002 | Shenderov | 204/450 |
| 2003/0082081 A1 | 5/2003 | Fouillet et al. | 422/105 |
| 2003/0164295 A1 | 9/2003 | Sterling | 204/450 |
| 2003/0183525 A1 | 10/2003 | Elrod et al. | 204/547 |
| 2003/0205632 A1 | 11/2003 | Kim et al. | 239/690 |
| 2003/0206351 A1 | 11/2003 | Kroupenkine | 359/665 |
| 2004/0007377 A1 | 1/2004 | Fouilett et al. | 174/52.1 |

OTHER PUBLICATIONS

Lee et al., "Microactuation by Continuous Electrowetting Phenomenon and Silicon Deep Rie Process", Proc. MEMS (DSC-vol. 66) ASME Int. Mechanical Engineering Congress and Exposition, Anaheim, CA, Nov. 1998, pp. 475-480.

Lee et al., "Liquid Micromotor Driven by Continuous Electrowetting", Proc. IEEE, Micro Electro Mechanical Systems Workshop, Heidelberg, Germany, Jan. 1998, pp. 538-543.

Fowler et al., "Enhancement of Mixing by Droplet-Based Microfluidics", IEEE, 2002, pp. 97-100.

Ding et al., "Reconfigurable Microfluidic System Architecture Based on Two-Dimensional Electrowetting Arrays", Modeling and Simulation of Microsystems 2001, 2001, pp. 181-185.

Pamula et al., "Microfluidic electrowetting-based droplet mixing", IEEE, 2002, pp. 8-10.

Saeki et al., "Electrowetting on Dielectrics (EWOD): Reducing Voltage Requirements for Microfluidics", Polym. Mater. Sci. Engr., vol. 85, pp. 12-13, no date provided.

Vivek et al., "Novel Acoustic-Wave Micromixer," IEEE International Micro Electro Mechanical Systems Conference, Miyazaki, Japan, Jan. 23-27, 2000, pp. 668-673.

Yang et al., "Ultrasonic Micromixer for Microfluidic Systems", MEMS'2000, pp. 80-85.

Yang et al., "Micromixer Incorporated with Piezoelectrially Driven Valveless Micropump", Micro Total Analysis Systems' 98, Klumer Acad. Pub, Dordrecht, Boston and London, pp. 177-180, 1998.

Lee et al., "Chaotic Mixing in Electrokinetically and Pressure Driven Micro Flows", Rhw 14th IEEE Workshop on MEMS, Jan. 2001.

Evans et al., "Planar Laminar Mixer", Proceeding of the IEEE 10th Annual Workshop of MEMS (MEMS '97), Nagoya, Japan, pp. 96-101, Jan. 1997.

Choi et al., "An Active Micro Mixer Using Electrohdrodynamic (EHD) Convection", Technical Digest of Solid-State Sensor and Actuator Workshop, Hilton Head Island SC, pp. 52-55, 2000.

Miyake et al., "Micro Mixer with Fast Diffusion", IEEE, pp. 248253, 1993.

Veenstra et al. "Characterization method for a new diffusion mixer applicable in micro flow injection analysis systems", Journal of Micromechanics and Microengineering, 9, (2), pp. 199-202, 1999.

Branebjerg et al., "Fast mixing by lamination", in Proc. of the 9th IEEE Micro Electro Mechanical Systems Workshop, eds. M. G. Allen and M. L. Reed (San Diego, Calif. ) pp. 441-446, 1996.

Krog et al., "Experiments and Simulations on a Micro-Mixer Fabricated using a Planar Silicon/Glass Technology", Microelectromechanical Systems (MEMS) DSC-vol. 59, ASME, pp. 177-182, 1996.

Schwesinger et al., "A Modular Microfluid System with an Integrated Micromixer", J. Micromech.Microeng. vol. 6, IOP Publishing Ltd., pp 99-102, Mar. 1996.

Schwesinger et al., "A Static Micromixer Built Up in Silicon", Proc. SPIE vol. 2642, pp 150-155, Sep., 1995.

Koch et al., "Two Simple Micromixers Based on Silicon", J. Micromech. Microeng. vol. 8, pp. 123-126, Jun. 1998.

Koch et al., "Micromachined Chemical Reaction System", Elsevier, Sensors and Actuators, vol. 74, pp. 207-210, 1999.

Koch et al., "Improved Characterization Technique for Micromixers", J. Micromech.Microeng. vol. 9, pp. 156-158, 1998.

Kämper et al., "Microfluidic Components for Biological and Chemical Microreactors", IEEE, pp. 338-343, no date provided.

Bertsch et al., "3D Micromixers—Downscaling Large Scale Industrial Static Mixers", IEEE, pp. 507-510, 2001, no date provided.

Voldman, "An Integrated Liquid Mixer/Valve", Journal of Microelectromechanical Systems, vol. 9, No. 3, pp. 295-302, Sep. 2000.

Hosokawa et al., "Droplet-Based Nano/Picoliter Mixer using Hydrophobic Microcapillary Vent", Twelfth IEEE International Conference on Micro Electro Mechanical Systems, IEEE, pp. 388-393, Jan. 1999.

Hosokawa et al., "Handling of Picoliter Liquid Samples in a Poly (dimethysiloxane)-Based Microfluidic Device", Anal. Chem., vol. 71, pp. 4781-4785, 1999.

Masao Washizu, "Electrostatic Actuation of Liquid Droplets of Microreactor Applications", IEEE Transactions on Industry Applications, vol. 34, No. 4, pp. 732-737, Jul./Aug. 1998.

Burns et al., "An Integrated Nanoliter DNA Analysis Device", Science, vol. 282, pp. 484-487, 1998.

Pollack et al., "Electrowetting-based Actuation of Liquid Droplets for Microfluidic Applications", Applied Physics Letters, vol. 77, No. 11, pp. 1725-1726, Sep. 11, 2000.

deRuijter et al., "Droplet Spreading: Partial Wetting Regime Revisited", Langmuir, vol. 15, pp. 2209-2216, 1999.

Dussan V. et al. "On the Motion of a Fluid-Fluid Interface Along a Solid Surface", J. Fluid Mech., vol. 65, pp. 71-95, 1974.

E.B. Dussan V., "Immiscible Liquid Displacement In A Capillary Tube: The Moving Contact Line", AlChe Journal, vol. 23, No. 1, pp. 131-133, Jan., 1977.

E.B. Dussan V., "On the Spreading of Liquids on Solid Surfaces: Static and Dynamic Contact Lines", Ann. Rev. Fluid Mech., vol. 11, pp. 371-400, 1979.

Huh et al., "Hydrodynamic Model of Steady Movement of a Solid/Liquid/Fluid Contact Line", Journal of Colloid and Interface Science, vol. 35, No. 1, pp. 85-101, Jan. 1971.

Liu et al., "Passive Mixing in a Three Dimensional Serpentine Microchannel", Journal of Microelectromechanical Systems, vol. 9, No. 2, pp. 190-197, 2000.

Fair, Richard B., "Non-Contact Electostatic Stamping for DNA Microarray Synthesis (20)", *smallTalk2001*, p. 139.

* cited by examiner

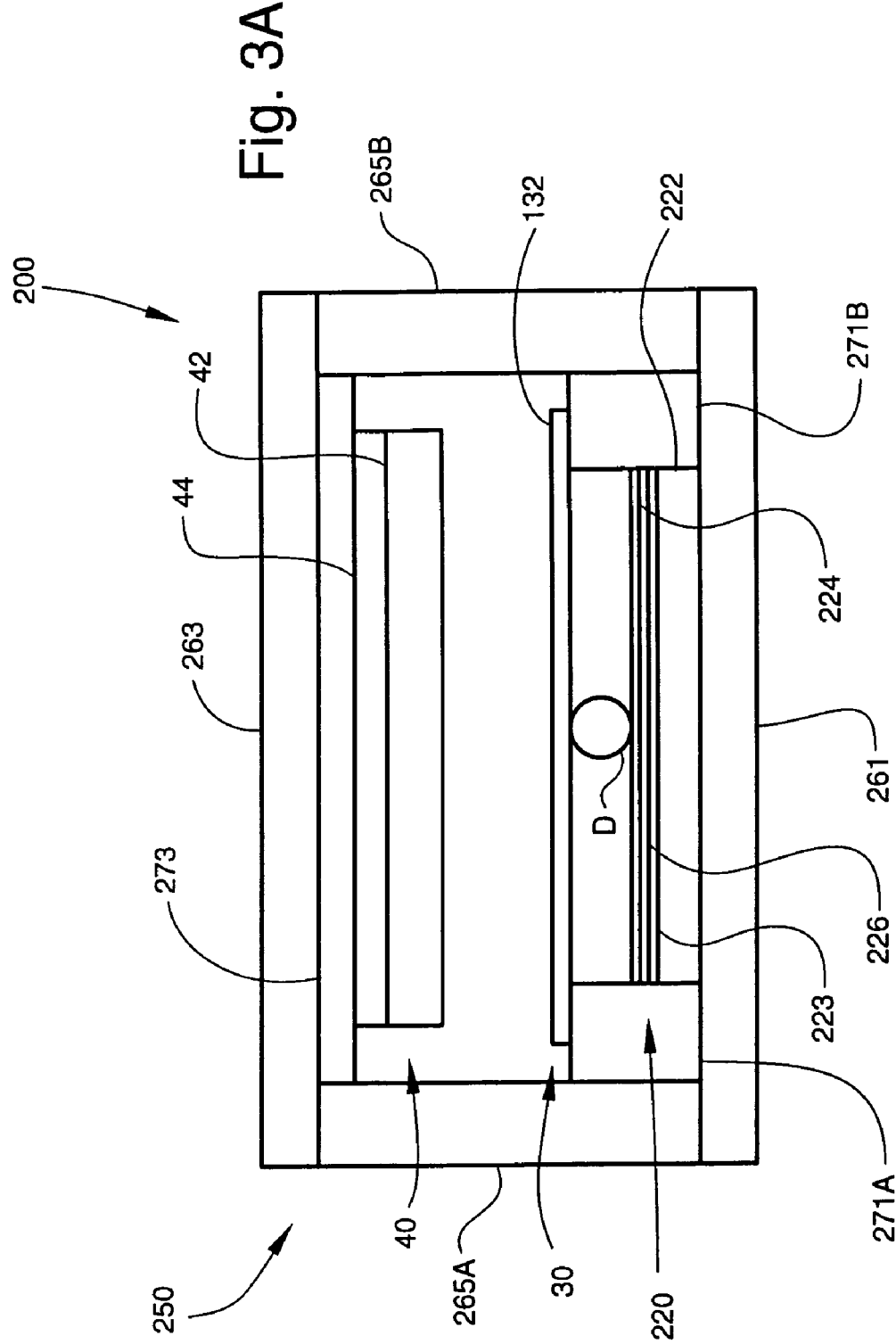

METHOD AND APPARATUS FOR NON-CONTACT ELECTROSTATIC ACTUATION OF DROPLETS

GOVERNMENT INTEREST

This invention was made with Government support under Grant No. F30602-98-2-0140 awarded by the Defense Advanced Research Projects Agency. The Government has certain rights in the invention.

TECHNICAL FIELD

The present invention is generally directed to the field of droplet actuation. More specifically, the present invention relates to non-contact, out-of-plane or z-axis, electrostatic actuation of droplets. A particularly advantageous application of the present invention relates to the fabrication of sample-containing microarrays.

BACKGROUND ART

Conventional techniques for in situ synthesis and custom microarray manufacturing have been developed in the field of biological, chemical, and biochemical assaying of samples (e.g., nucleic acids, proteins, pharmaceutical compounds, and other analytes of interest), for use in sample detection, monitoring, and analysis. For example, DNA microarray technology is currently being developed for use in genomic research and diagnostic applications in which the ability to simultaneously analyze thousands of DNA sequences is beneficial. While in situ synthesis can provide enormous densities, the technique is not suitable for rapid prototyping. On the other hand, several problematic issues arise with regard to techniques relating to custom microarray printing technologies, including the size of the devices needed for sophisticated robotics, humidity and temperature control, the requirement of clean surroundings, wear and tear of the tips of pins or quills conventionally used, and expense of the equipment needed.

Microarrays are typically fabricated by printing or spotting, which entails dispensing very small volumes (i.e., the nanoliter and picoliter ranges) of sample material onto the surface of a solid substrate such as a glass slide. Both non-contact and contact dispensing techniques are being developed. Non-contact dispensing is performed by ejecting sample droplets from a dispenser onto the substrate. Currently, adaptations of ink-jet printing techniques are popular means for performing non-contact dispensing. Contact printing, on the other hand, requires direct contact of the dispensing device (e.g., capillary tubes, solid pins, split pins, and tweezers) with the substrate.

One example of a contact dispensing technique is disclosed in U.S. Pat. No. 6,110,426 to Shalon et al., which describes a method for fabricating microarrays of biological samples by using a capillary reagent dispenser that must contact the microarray surface to dispense its contents. In another example, arrays of pins are dipped into a sample solution and the tips of the pins are then brought into contact with a slide surface, leaving sample spots on the surface. The diameter of each pin primarily determines the size of the sample dispensed onto the surface. In another technique, a ring is dipped into the sample solution to draw sample liquid across its opening. A solid pin is then thrust through the opening and tapped against the substrate to dispense a portion of the sample onto the substrate. When employed to fabricate more than a few microarrays, the use of such contact techniques are undesirably slow processes. Moreover, these techniques have created problems with uniformity in sample volume, equipment durability, and spot reproducibility.

Non-contact dispensing techniques based on ink-jet technology typically entail the use of a piezoelectric crystal or a syringe-solenoid actuating device. For example, a piezoelectric crystal can be placed in contact with a capillary tube containing a sample fluid. By applying a voltage to the crystal is biased to deform at a rapid rate over a small deformation distance. As a result, the capillary is vibrated and ejects droplets from its tip. The high frequency response of the crystal and the small distance through which it vibrates enables thousands of droplets of small volume to be dispensed. On the other hand, the syringe-solenoid device is constructed by connecting a syringe pump between a reservoir and a solenoid valve through tubing. Actuation of the syringe creates liquid pressure in the system, enabling the valve to dispense samples from its outlet. This latter system requires a liquid media such as water. While such non-contact array printing methods address some of the aforementioned problems relating to microarray printing, they do not solve all of them and add new problems of their own. Keeping the inkjet orifices free of contaminants is one such problem. Moreover, air bubbles can develop that impair reliability. In addition, the size or footprint of the system can still be a problem.

In another example, U.S. Pat. No. 6,231,177 to Cherukuri et al. discloses a device that uses electrohydrodynamic (EHD) micropumps to dispense fluid from orifices onto textured paper. While the device can be scaled to a small size, it is similar to inkjet devices and burdened by similar problems.

It is therefore acknowledged by persons skilled in the art that ongoing development is needed to provide improved methods for non-contact microarray printing.

DISCLOSURE OF THE INVENTION

In general, the present invention provides an apparatus adapted for electrostatically actuating a droplet, and preferably an array of droplets, out from one plane to another plane (i.e., z-axis actuation). The apparatus generally comprises a first plane on which droplets are initially supplied, an elongate intermediate element spaced from the first plane, and a second plane spaced from the intermediate element that serves as the destination for actuated droplets. The first and second planes and the elongate intermediate element are rendered conductive to bring about and control the actuation of the droplet. Thus, the main structural portion of the intermediate element can be composed of a conductive (or semiconductive) material. Alternatively, the main structural portion of the intermediate element can be plated, coated, or otherwise treated with a conductive layer or film by a conventional process such as thin film deposition, plating, spin-coating, metallization, or the like. The elongate intermediate element is employed primarily to electrically ground the droplet. Thus, depending on droplet size, the axial distance between the first plane and the intermediate element is small enough to ensure that a droplet residing on the first plane contacts the intermediate element as well.

In operation, the droplet is initially placed between the first plane and the elongate intermediate element. A voltage is then applied between the intermediate element and the second plane. The droplet becomes charged and attracted to the second plane. As a result, the droplet moves from the first plane, through or around the elongate intermediate element, and into contact with the second plane. In some embodiments, the first plane is a lower plane, the second plane is an upper plane, and the intermediate element is disposed between the upper and lower plane in terms of elevation. The actuation provided by the invention is strong enough to cause the droplet to move upwards into contact with the upper plane against the opposing gravitational force. An excessively high voltage is not needed to drive the actuation because, in the microscale context in which the invention is preferably implemented, the dominant physical factor is surface tension rather than other factors such as acceleration and gravity.

The invention is particularly advantageous for synthesizing (i.e., "stamping" or "printing") a microarray of analyte-containing samples, without the use of conventional instruments that require contacting the droplet and/or microarray surface such as pens and pipettes. Actuation of one or more droplets results in those droplets contacting precise coordinates on a surface of the second plane. For this purpose, the surface of the second plane to be stamped is preferably hydrophilic so that a droplet, upon contacting the surface, spreads so as to form a spot and stamp its analyte contents on the surface. Moreover, because the droplet contacts the first plane and elongate intermediate element prior to being actuated, it is preferable that the first plane and the intermediate element include hydrophobic surfaces.

In one embodiment, the intermediate element comprises an elongate element such as a wire, or a plurality of such elongate elements. Droplets move around the elongate element during actuation.

Droplets can be supplied to the apparatus by different methods. In one embodiment, the first plane includes an array of electrodes. Using an electrowetting technique, selected electrodes can be sequentially energized and de-energized to cause droplets proximate to such electrodes to move to intended positions on the array prior to being actuated. To cause movement of the droplets by electrowetting, a voltage potential is applied between the elongate intermediate element (which is typically grounded) and one or more selected electrodes of the first plane. As an alternative to electrowetting-based droplet movement, droplets can be positioned on the first plane by more conventional dosing or dispensing methods, and the first plane then moved into position underneath the intermediate element and the second plane.

According to one embodiment of the present invention, an apparatus for actuating a droplet comprises a first conductive layer, a second conductive layer, a conductive elongate medial element, and a voltage source. The first conductive layer comprises a first hydrophobic surface. The second conductive layer comprises a hydrophilic surface facing the first hydrophobic surface. The second conductive layer is axially spaced from the first conductive layer to define a gap therebetween. The conductive elongate medial element is disposed in the gap between the first and second conductive layers, and comprises a second hydrophobic surface. The voltage source communicates with the second conductive layer and the elongate medial element.

The present invention also provides a method for electrostatically actuating a droplet. A droplet is placed on a first conductive layer. The droplet is grounded by contacting the droplet with an elongate grounding element that is axially spaced from the first conductive layer. The droplet is actuated by applying a voltage potential between the grounding element and a second conductive layer axially spaced from the grounding element. The droplet becomes charged and attracted to the second conductive layer. Accordingly, the droplet moves off the first conductive layer into contact with a hydrophilic surface of the second conductive layer.

The present invention further provides a microarray structure synthesized according to the method just described. The resulting structure comprises a surface and a plurality of sample-containing spots disposed on the surface.

It is therefore an object of the present invention to provide a method arid apparatus for performing non-contact electrostatic actuation of droplets from one plane to another plane.

It is another object of the present invention to perform such actuation in the context of synthesizing a microarray, in which the contents of actuated droplets are stamped or printed onto a surface of the microarray.

It is yet another object of the present invention to perform microarray synthesis or fabrication by z-axis, non-contact electrostatic actuation of droplets, wherein the sizes of the spots produced on the microarray surface are controllable and reproducible.

It is a further object of the present invention to perform z-axis, non-contact electrostatic actuation of droplets using voltages lower than heretofore possible.

It is a yet further object of the present invention to perform microarray synthesis by means of droplet-based, z-axis, non-contact electrostatic actuation, wherein the actuation events do not affect the binding of molecules to the microarray.

Some of the objects of the invention having been stated hereinabove, other objects will become evident as the description proceeds when taken in connection with the accompanying drawings as best described hereinbelow.

BRIEF DESCRIPTION OF THE DRAWINGS

FIG. 3A is a side elevation view in cross-section of an encapsulated droplet actuating apparatus provided in accordance with the present invention;

DETAILED DESCRIPTION OF THE INVENTION

For purposes of the present disclosure, the terms "layer" and "film" are used interchangeably to denote a structure or body that typically is deposited on, formed on, coats, treats, or is otherwise disposed on another structure.

For purposes of the present disclosure, the term "communicate" (e.g., a first component "communicates with" or "is in communication with" a second component) is used herein to indicate a structural, functional, mechanical, optical, electrical, or fluidic relationship, or any combination thereof, between two or more components or elements. As such, the fact that one component is said to communicate with a second component is not intended to exclude the possibility that additional components may be present between, and/or operatively associated or engaged with, the first and second components.

For purposes of the present disclosure, it will be understood that when a given component such as a layer, region or substrate is referred to herein as being disposed or formed "on" another component, that given component can be directly on the other component or, alternatively, intervening components (for example, one or more buffer layers, interlayers, electrodes or contacts) can also be present. It will be further understood that the terms "disposed on" and "formed on" are used interchangeably to describe how a given component is positioned or situated in relation to another component. Hence, the terms "disposed on" and "formed on" are not intended to introduce any limitations relating to particular methods of material transport, deposition, or fabrication.

For purposes of the present disclosure, it will be understood that when a liquid in any form (e.g., a droplet or a continuous body, whether moving or stationary) is described as being "on", "at", or "over" an electrode, array, matrix or surface, such liquid could be either in direct contact with the electrode/array/matrix/surface, or could be in contact with one or more layers or films that are interposed between the liquid and the electrode/array/matrix/surface.

Figure 1A:
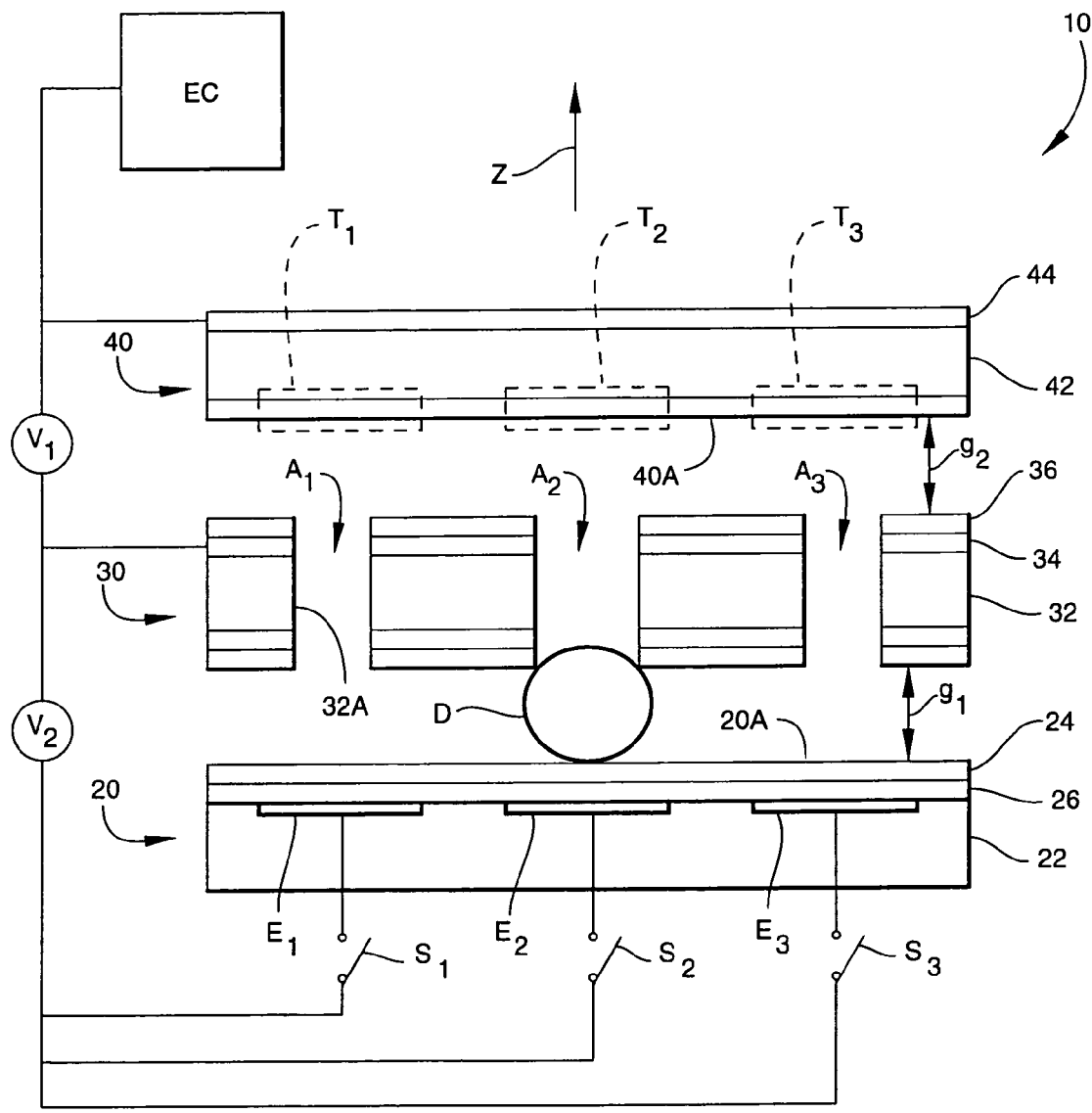
FIG. 1A is a side elevation view in cross-section of a droplet actuating apparatus provided in accordance with the present invention, wherein a droplet has been placed on a first plane of the apparatus.

Referring now to FIG. 1A, one example of a droplet actuating apparatus, generally designated 10, has a mid-plate configuration and is illustrated for comparison with a more preferred wire traction configuration of the invention described below. Apparatus 10 comprises a first layer or plane generally designated 20, an intermediate element generally designated 30, and a second plane generally designated 40. First plane 20, intermediate element 30, and second plane 40 are generally arranged along a z-axis Z. First plane 20 is axially spaced from intermediate element 20 by a gap $g_1$, and intermediate element 30 is axially spaced from second plane 40 by a gap $g_2$.

First plane 20 comprises a first planar body 22 such as a plate or substrate. First planar body 22 can be composed of a non-conductive material, such as a glass or polymer, or can be a semiconductor. Typically, first planar body 22 is a dielectric material such as a glass coverslip that is rendered conductive by forming one or more control electrodes E (e.g., $E_1$, $E_2$, and $E_3$ as illustrated in FIG. 1A) thereon, such as by performing a metallization process followed by a suitable masking/etching technique. A droplet-contacting surface 20A of first plane 20 is hydrophobized by providing a hydrophobic film or layer 24 on first plane. One non-limiting example of a suitable hydrophobic material is PTFE (polytetrafluoroethylene). PTFE is commercially available as the series of TEFLON® materials, such as TEFLON AF®, commercially available from E. I. duPont deNemours and Company, Wilmington, Del. Hydrophobic layer 24 also serves to electrically insulate first plane 20 (in particular, control electrodes $E_1$, $E_2$, and $E_3$) from other components of apparatus 10. Alternatively, first plane 20 can be treated with a parylene coating 26 such as Parylene C coating prior to applying hydrophobic layer 24 as illustrated in FIG. 1A.

A droplet D is shown residing on control electrode $E_2$ prior to actuation. Droplet D is electrolytic, polarizable, or otherwise capable of conducting current or being electrically charged. Typically, droplet D ranges in size between approximately 10 $\mu$m to approximately 2 mm in diameter.

In the example illustrated in FIG. 1A, intermediate element 30 is provided in the form of a medial plate 32 and is spaced along the z-axis from first plane by gap $g_1$. The thickness of medial plate 32 is thin (e.g., 160 microns) in relation to first plane 20 and second plane 40. Medial plate 32 is perforated with an array of apertures, generally designated A (e.g., apertures $A_1$, $A_2$, and $A_3$ as illustrated in FIG. 1A), having respective axes oriented substantially along the z-axis. Apertures $A_1$, $A_2$, and $A_3$ can be formed by any conventional micromachining process suitable for the material used for medial plate 32, such as microdrilling, acoustic drilling, etching, and the like. To ensure that any droplet D initially provided on first plane 20 is grounded (i.e., without needing to physically actuate first plane 20 or intermediate element 30 toward each other along the z-axis), gap $g_1$ is small enough that droplet D contacts intermediate element 30. Otherwise, droplet D might electrically float and not be actuated. Thus, gap $g_1$ should be no greater than the size that droplet D would have in an unconstrained state.

Medial plate 32 of intermediate element 30 can be composed of a conductive material, a semi-conductive material, or a dielectric material. Preferably, medial plate 32 is a dielectric material such as a glass coverslip that is rendered conductive by applying a conductive layer 34 such as sputtered indium tin oxide (ITO). ITO is also preferred for its transparent property. During actuation as described hereinbelow, each droplet D must move through its corresponding aperture A to reach second plane 40. Therefore, medial plate 32 is preferably hydrophobized as described above in connection with first plane 20, and thus FIG. 1A illustrates a hydrophobic layer 36 covering medial plate 32. Hydrophobic layer 36 prevents stiction between droplets D and apertures 32 during actuation, and also electrically insulates medial plate 32. Preferably, hydrophobic layer 36 also covers the inside surfaces 32A of apertures A through the thickness of medial plate 32, although for clarity this is not shown in FIG. 1A. In addition, as in the case of first plane 20, an additional insulative coating such as parylene (not specifically shown) can be provided between conductive layer 34 and hydrophobic layer 36 of medial plate 32.

Second plane 40 comprises a second planar body 42 such as a plate or substrate. Second planar body 42 can be composed of a conductive material, a semi-conductive material, or a dielectric material. Preferably, second planar body 42 comprises a derivativized glass plate. As known in the art, particularly in the field of microarray fabrication, glass plates can be derivatized by applying, for example, a poly-(L)-lysine coating. Thus, the surface of second plane 40 facing first plane, surface 40A, is hydrophilic. Second plane 40 is rendered conductive by applying a conductive layer 44 such as sputtered ITO. Second plane 40 at least conceptually comprises an array of target sites T (e.g., $T_1$, $T_2$, and $T_3$ as illustrated in FIG. 1A) defined along surface 40A that designate precise locations with which actuated droplets D come into contact. In the case where control electrodes $E_1$, $E_2$ and $E_3$ are associated with first plane 20, it is preferable that one target site T be aligned with one control electrode E and one aperture A. Accordingly, each droplet D provided on first plane 20 has a linear or substantially linear actuation path generally directed along the z-axis from its corresponding control electrode E of first plane 20, through its corresponding aperture A of intermediate element 30, and to its corresponding target site T of second plane 40. For purposes of multi-sample assaying and/or detection, each target site T can comprise an analyte-specific binding agent or reagent, as is commonly known in the microarray fabrication art.

FIG. 1A also schematically illustrates electrical connections made to apparatus 10. To properly effect electrostatic actuation of droplet D, a suitable voltage source $V_1$ is connected between the respective conductive portions of second plane 40 and intermediate element 30. In the case where control electrodes E are provided with first plane 20 to control movement and positioning of droplets D, another voltage source $V_2$ is connected between the respective conductive portions of intermediate element 30 and first plane 20. Voltage sources $V_1$ and $V_2$ preferably are DC voltage sources. As also shown in FIG. 1A, an electronic controller EC of suitable design (e.g., a microcontroller) is placed in communication with voltage sources $V_1$ and $V_2$ to control actuation and movement of droplets D. If desired, one or more of control electrodes E can be individually controlled (i.e., control electrodes E can be independently addressable). Individual control can be accomplished by providing each control electrode E or group of control electrodes E with a dedicated voltage source or, as illustrated in FIG. 1A, by providing switches $S_1$, $S_2$ and $S_3$ or equivalent features.

Control electrodes $E_1$, $E_2$ and $E_3$ are useful for controlling the movement and positioning of droplets D prior to or after actuation. Thus, control electrodes $E_1$, $E_2$ and $E_3$ can be employed to transport one or more droplets D from another portion of the structure of apparatus 10, such as a sample reservoir or injection site, to predetermined positions on the array of first plane 20 in alignment with corresponding apertures $A_1$, $A_2$, and $A_3$ of intermediate element 30 and target sites $T_1$, $T_2$, and $T_3$ of second plane 40. In a case where the stamping of droplets D results in unneeded, residual liquid masses, the residual material can returned to first plane 20 and transported away from apparatus 10 by control electrodes $E_1$, $E_2$ and $E_3$ across first plane 20 to an appropriate waste location. Preferably, control electrodes $E_1$, $E_2$ and $E_3$ operate on the principle of electrowetting, which is described in detail by Pollack et al., "Electrowetting-based actuation of liquid droplets for microfluidic applications", Appl. Phys. Lett., Vol. 77, p. 1725 (September 2000). Additional disclosures of electrowetting techniques and applications therefor are provided in the two commonly assigned, co-pending U.S. Patent application Ser. Nos. 10/253,342 and 10/253,368, both entitled "METHODS FOR MANIPULATING DROPLETS BY ELECTROWETTING-BASED TECHNIQUES", filed concurrently herewith, the contents of which are incorporated herein in their entirety.

Briefly, the electrowetting technique involves controlling the surface tension on droplet D, and hence the contact angles droplet D makes with the surfaces it contacts, through application of a voltage potential between intermediate element 30 (serving as the ground plane) and first plane 20. The size of droplet D and the distance of gap $g_1$ are such that the footprint of droplet D overlaps the electrodes (e.g., control electrodes $E_1$ and $E_3$) adjacent to the electrode (e.g., control electrode $E_2$), thereby allowing droplet D to be moved electrode-by-electrode to any point on the array of first plane 20. Referring to FIG. 1A and considering, as an example, the movement of droplet D from control electrode $E_1$ to control electrode $E_2$, both control electrodes $E_1$ and $E_2$ are initially grounded (i.e., switches $S_1$ and $S_2$ are open as illustrated), and the contact angle everywhere on droplet D is equal to the equilibrium contact angle associated with that droplet D. When an electrical potential is applied to energize control electrodes $E_1$, and $E_2$, a layer of charge builds up at the interface between droplet D and control electrodes $E_1$ and $E_2$, resulting in a local reduction of the interfacial energy $\gamma_{SL}$. Surface 20A of first plane 20 in effect becomes hydrophilic in the vicinities of control electrodes $E_1$ and $E_2$, and droplet D spreads over control electrodes $E_1$ and $E_2$. The meniscus of droplet D is deformed asymmetrically and a pressure gradient is established between the ends of droplet D. Subsequent de-energizing of control electrode $E_1$ renders the region of surface 20A over control electrode $E_1$ hydrophobic once again, resulting in bulk flow of droplet D towards the remaining energized electrode $E_2$. The voltage potential at control electrode $E_1$ is then removed, and droplet D is centered on control electrode $E_2$ as shown in FIG. 1A.

Figure 1B:
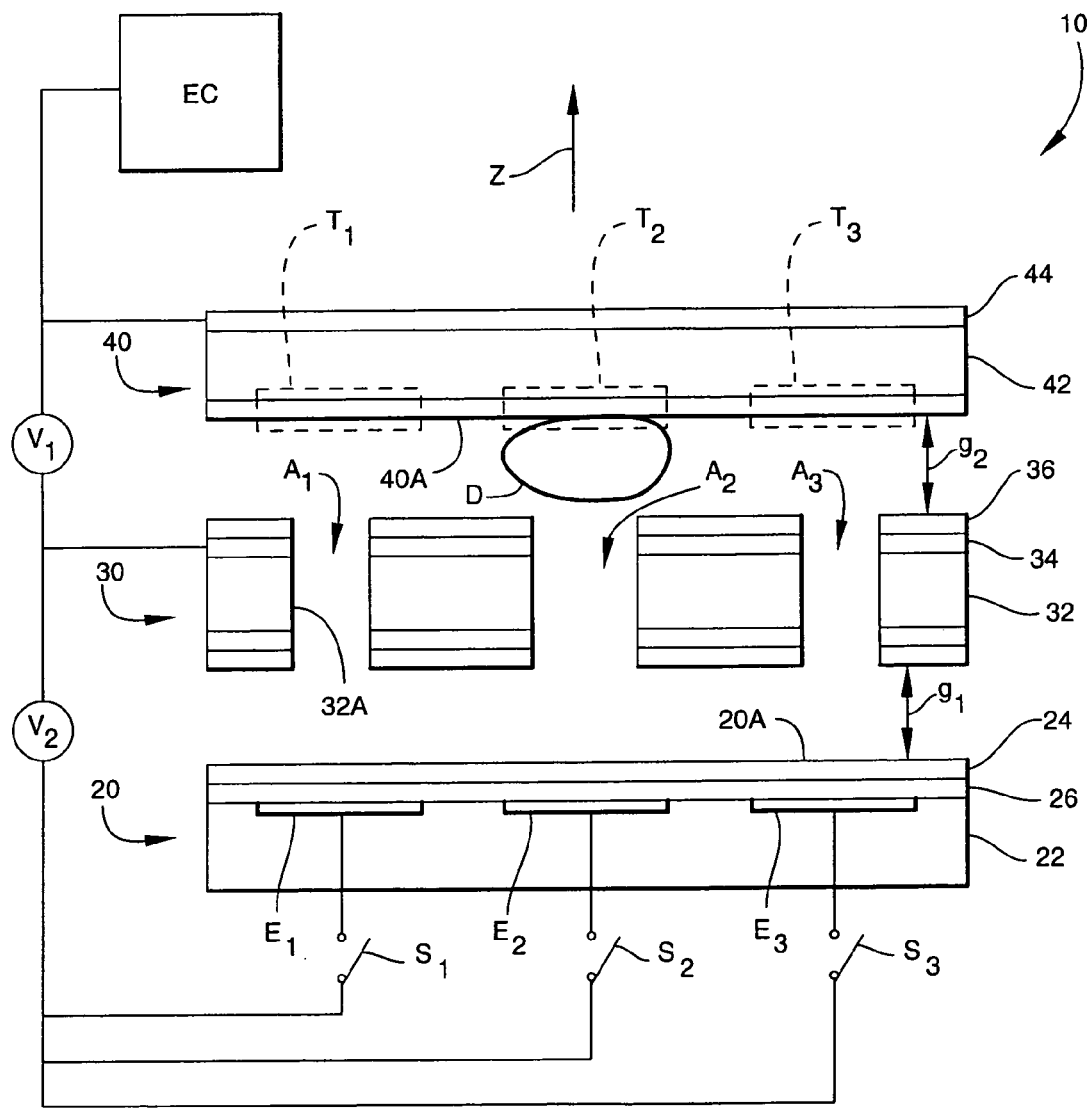
FIG. 1B is a side elevation view in cross-section of the apparatus illustrated in FIG. 1A, wherein the droplet has been actuated into contact with a second plane spaced from the first plane.

Referring now to FIGS. 1A and 1B, the electrostatic actuation of droplet D will now be described. As shown in FIG. 1A, droplet D is initially positioned between first plane 20 and intermediate element 30 in proper alignment with a designated aperture (e.g., $A_2$) of intermediate element 30 and a corresponding target site (e.g., $T_2$) of second plane 40. This positioning is accomplished either by the electrowetting technique using control electrodes E as just described, or by first loading droplet D onto first plane 20 by conventional means and moving first plane 20 with droplet D into the proper aligned position. Voltage source $V_1$ is then used to apply a voltage between intermediate element 30 and second plane 40. Droplet D becomes charged and attracted to second plane 40. As a result, droplet D moves from first plane 20, through aperture $A_2$, and into contact with surface 40A of second plane 40 at target site $T_2$ as shown in FIG. 1B. Because surface 40A of second plane 40 is hydrophilic, or at least is non-hydrophobic, droplet D spreads to form a spot at its designated target site $T_2$, as represented by the flattened shape of droplet D shown in FIG. 1B. In the case where apparatus 10 is employed for microarray stamping, an array of droplets D are actuated in this manner, resulting in the synthesis of an array of sample contents onto surface 40A of second plane 40. Second plane 40 can then be removed to interact with an appropriate analytical instrument for detection, measurement, and/or analysis of the samples of the array. Depending on the nature of target sites T, the analyte constituents of droplet D become bound to target site T by adhesion, adsorption, electrical attraction or polarization, or chemical binding, linking or reaction.

The principle underlying the droplet-based actuation process just described can be explained as follows. From Gauss' law, it is known that:

$$\nabla E = \rho/\epsilon \text{ or,} \qquad (1)$$

$$\nabla^2 V = -\rho/\epsilon. \qquad (2)$$

The fundamental implication of Gauss' law is that the charge density inside of any closed Gaussian surface containing a conductor can be increased by increasing the divergence of the electric field lines. An increase in surface charge density, $\rho$, will cause an increase in the force exerted on the surface. Hence, for a given electric field, higher forces can be achieved if the field divergence is larger. This means that if electric flux concentration is increased, a higher $\rho$ can be obtained for the same voltage.

The example illustrated in FIGS. 1A and 1B, with its mid-plate system, requires very high voltages for actuation (e.g., 1 kV). This follows because medial plate 32 with apertures A (see FIG. 1A) shields droplet D. Thus, droplet D itself has relatively lower surface charge density, which again follows from Gauss' law. This means that the net force acting on droplet D is less than what it would be in the case where entire droplet D is exposed to the electric field. One way to increase the electric field lines converging on droplet D is to increase the applied voltage. Another way is exposing more of droplet D to the electric field. This would lead to greater charge densities on the drop. However, any aperture A cannot be larger than droplet D because droplet D would lose contact with medial plate 32 and thus would electrically float. Thus, there is a conflicting requirement. To increase the surface exposed to the field, aperture A would need to be made larger. However, aperture A cannot be so large that droplet D loses electrical contact with the medial plate 32.

Figure 2:
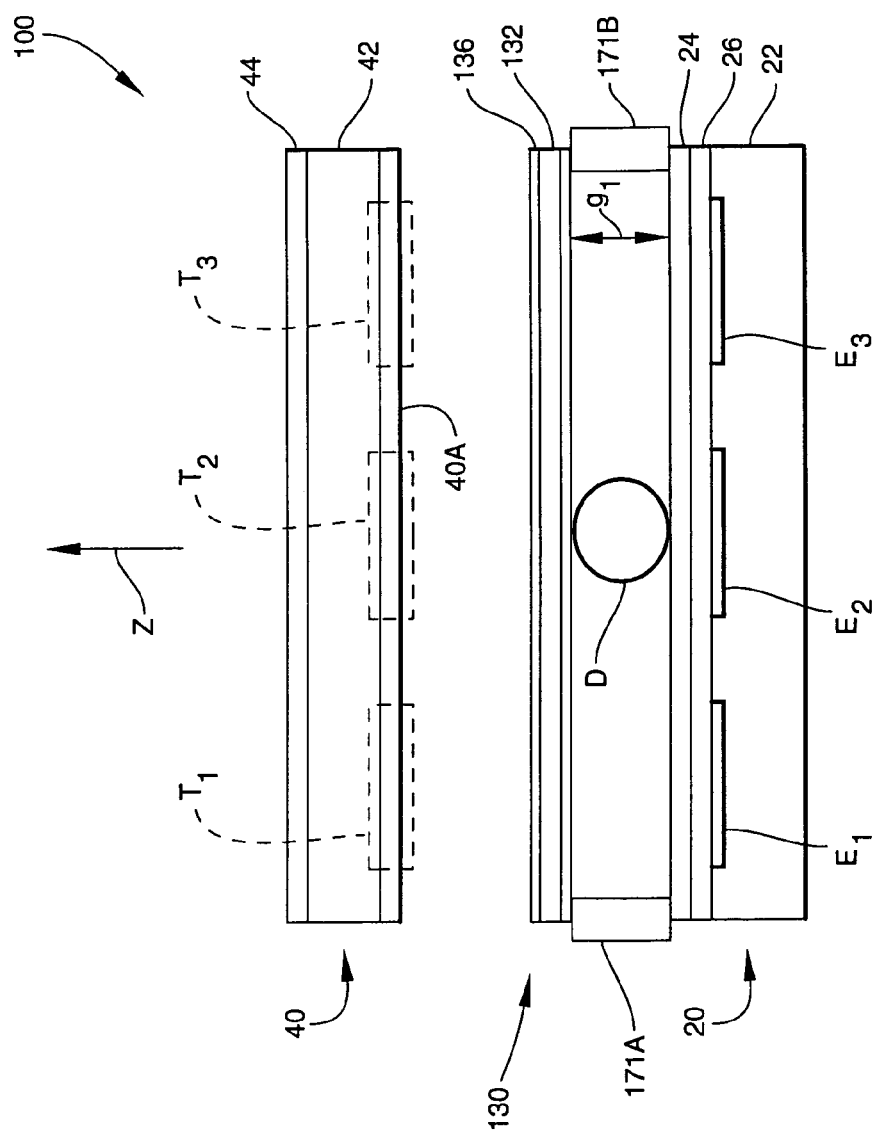
FIG. 2 is a side elevation view in cross-section of a droplet actuating apparatus provided in accordance with an alternative embodiment of the present invention.

The problems attending devices such as apparatus 10 are removed with the wire traction system provided by the present invention. Referring now to FIG. 2, a droplet actuating apparatus, generally designated 100, is illustrated. Apparatus 100 is characterized by a wire traction design according to a preferred embodiment of the invention. The structure of apparatus 100 can represent a portion of a microfluidic chip, as that term is understood by persons skilled in the art, or a portion of such a microfluidic chip. The chip can be fabricated according to known technology. The chip can serve a dedicated purpose that benefits from the droplet-based electrostatic actuation disclosed herein, such as for microarray synthesis. Alternatively, apparatus 100 can be integrated with conventional microfluidic and/or microelectronic components that also are fabricated on the same chip. As examples, the chip can also include resistive heating areas or elements, microchannels, micropumps, pressure sensors, optical waveguides, and/or biosensing or chemosensing elements interfaced with MOS (metal oxide semiconductor) circuitry.

As a principal difference from apparatus 10 illustrated in FIGS. 1A and 1B, apparatus 100 provides an intermediate element 130 in the form of a conductive elongate element 132 such as a wire or narrow beam, or a parallel series of such elongate elements 132. Each elongate element 132 is strung or suspended over first plane 20 at the distance of gap $g_1$ and supported by appropriate mounting elements such as spacer blocks 171A and 171B. The magnitude of gap $g_1$ is selected to ensure droplet D contacts elongate element 132 when droplet D is at a pre-actuation position, and thus depends on the size or volume of droplet D. As one example, gap $g_1$ is approximately 0.05–2 mm. Preferably, the material of elongate element 132 itself is conductive. In one successful embodiment, a platinum wire is employed. Each elongate element 132 is hydrophobized in the manner described hereinabove, as represented by hydrophobic layer 136. Elongate element 132 serves as a ground line to assist in charging droplet D and thereby effect electrostatic attraction and hence actuation. Thus, elongate element 132 is similar in function to perforated medial plate 32 (FIGS. 1A and 1B) of apparatus 10. The operation of apparatus 100 is also analogous to that of apparatus 10, except that droplet D when actuated moves around or on one side of elongate element 132 during its travel to second plane 40.

By comparison to the mid-plate configuration of apparatus 10, however, in the wire traction configuration of apparatus 100 there is a marked increase in the electric field density (and as a consequence, by Gauss' law, higher charge densities) on the surface of droplet D. The electric field strength near the surface of droplet D is nearly an order of magnitude greater than the electric field strength at a similar point in the mid-plate configuration of apparatus 10. Also, the surface area of droplet D directly under the influence of the electric field is greatly increased. The higher surface charge densities result in a higher electrostatic pressure on the droplet surface which, when integrated over the entire surface of droplet D, results in a much larger force on droplet D as compared to that in the mid-plate system illustrated in FIGS. 1A and 1B.

It will be noted that charge density could also be increased on the droplet surface by: (1) increasing the dielectric permittivity of the dielectric medium surrounding droplet D (i.e., the use of a silicone oil); (2) increasing the electrostatic drive voltage; or (3) changing the geometry of the configuration of apparatus 10 or 100 in such a way that the $\nabla^2 V$ term in Equation (2) hereinabove increases even though the magnitude of the voltage itself is constant. For apparatus 100, however, the charge density on the droplet surface has been increased without increasing the voltage. The result is a much higher charge density for the same voltage in the wire traction system of apparatus 100 as compared to the mid-plate system of apparatus 10.

Figure 3B:
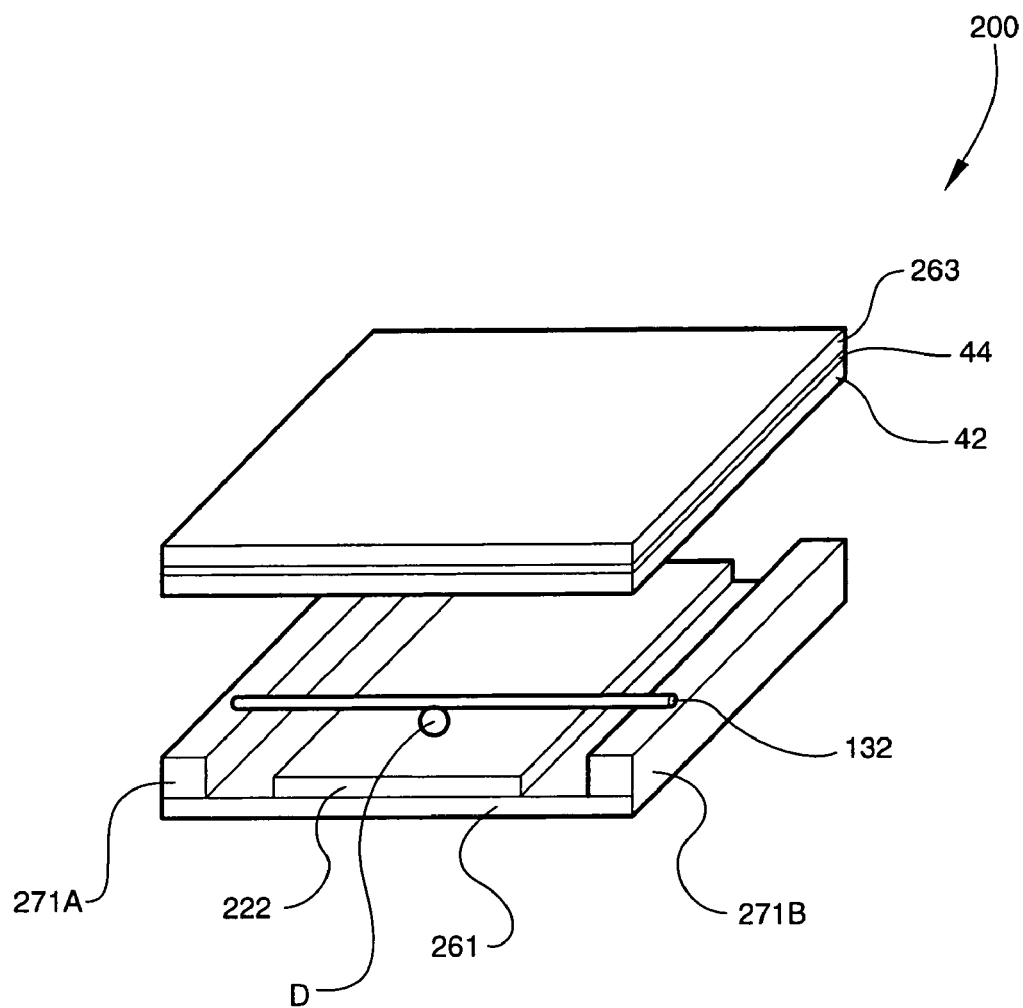
FIG. 3B is an exploded perspective view of the encapsulated droplet actuating apparatus illustrated in FIG. 3A.

Referring now to FIGS. 3A and 3B, apparatus 100 can be encapsulated as part of a fabrication strategy for a microfluidic chip or similar device. Accordingly, FIGS. 3A and 3B illustrate an encapsulated droplet-based electrostatic actuation apparatus, generally designated 200. Apparatus 200 utilizes the wire traction system previously described with respect to apparatus 100. Thus, elongate element 132 and second plane 40 can have essentially the same design as previously described with reference to FIG. 2. FIG. 3A, however, illustrates a first plane 220 having an alternative configuration. First plane 220 is removable and does not include individual control electrodes. Instead, first plane 220 comprises a planar body 222 such as a glass slide, a continuous conductive layer 223 formed on planar body 222 such as chromium or ITO, and a hydrophobic layer 224 formed on conductive layer 223. As described hereinabove, a dielectric layer 226 such as parylene could also be disposed between conductive layer 223 and the hydrophobic layer 224. This removable design for first plane 220 could be substituted for first plane 20 employed in the embodiment described hereinabove with reference to FIG. 2.

As shown in FIG. 3A, the features comprising the wire traction system are encapsulated in a container, generally designated 250. Container 250 can take any number of forms, depending on the fabrication strategy employed to realize encapsulated apparatus 200. In the present example, container 250 is defined primarily by a lower member or base 261, an upper member or lid 263, and one or more lateral members 265A and 265B extending between lower member 261 and upper member 263 as necessary to complete the encapsulation. Lower member 261 supports first plane 220 and, preferably, one or more spacer blocks 271A and 271B that in turn support elongate member or members 132. Upper member 263 serves as a lid. Second plane 40 is attached to upper member 263 or, as illustrated, to a spacer member or adapter 273 that is in turn attached to upper member 263. First plane 220 can be loaded into container 250 prior to full encapsulation and removed after completion of an actuation process. The removability of first plane 220 is useful in a case where control electrodes or other automated means are not provided for conveying and positioning droplets D. In any case, the removability of first plane 220 facilitates replacement of first plane 220 if its hydrophobic surface 224 becomes degraded through extensive use. In addition, the internal volume of apparatus 200 encapsulated by container 250 can be flooded with a filler fluid that is immiscible with droplet D, such as silicone oil.

An encapsulated wire traction system represented by apparatus 200 was evaluated in the following EXPERIMENT.

EXPERIMENT

Figure 4:
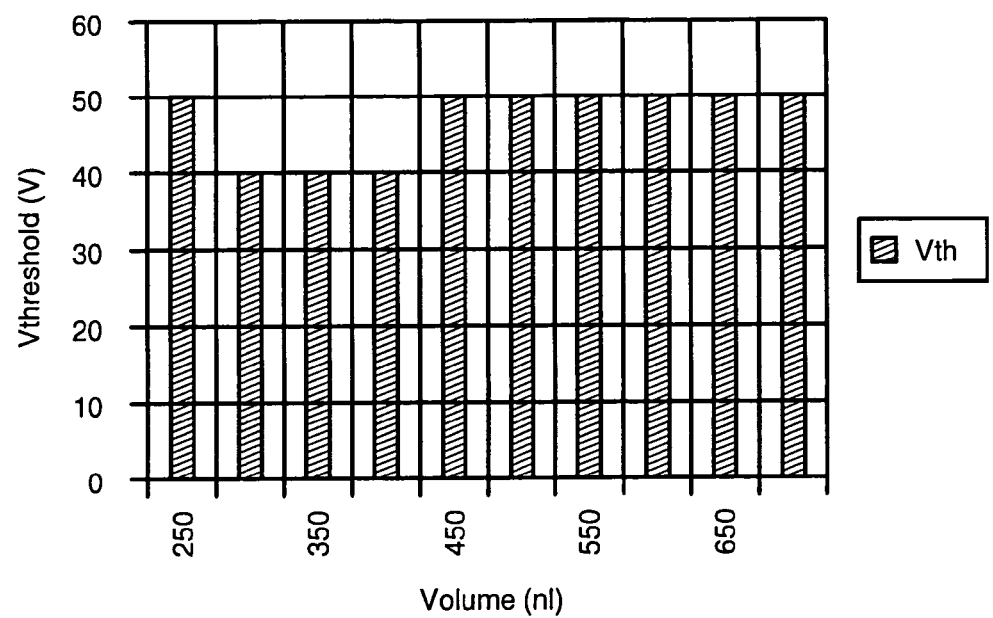
FIG. 4 is a graph showing the variation of actuation voltage as a function of the droplet volume illustrating the performance of the droplet actuating apparatus of the present invention.

Referring to FIG. 4, the variation of actuation voltage as a function of droplet volume is indicated for two different viscosities of oil and gap heights. The droplets used in the experiment contained DNA samples. The actuation voltage is almost independent of the droplet volume in the 250 nl–700 nl range. This is true even when the viscosity of the oil is changed to 2 Cst. The actuation occurs at 40 V in the system with 50 Cst oil and a gap height of 560 $\mu$m while for the same volumes, the actuation voltage is around 50 V in the system containing 2 Cst oil with a gap height of 590 $\mu$m. Thus, the wire traction configuration allows actuation of droplets at voltages about 25 times lower than the mid-plate configuration and prior art devices.

From FIG. 4, it is evident that minimum actuation voltage is almost independent of droplet volume. In the lower ranges (sub 400 nl range), the actuation voltage seemed to drop by 10 V and return to 50 V at 250 nl. This was consistent over many runs. The reason is that the force needed to pull up a smaller volume is less than that required for a larger volume. Hence, the corresponding charge densities needed to actuate a droplet of smaller volume is less than the charge density needed to actuate a droplet of larger volume. This in turn implies lower voltages. The observation that the actuation voltage actually increased for the droplet with a volume of 250 nl could be explained as being an experimental anomaly. However, several trials gave the same result. The reason for this increase in actuation could be attributed to smaller droplet area. The droplet was very small and nearly a third of its surface was covered by the wire (e.g., elongate element 132 in FIGS. 3A and 3B). This means that the electric field to which the droplet surface was exposed is less than what it would be were the droplet larger. This could contribute to the slight increase in actuation voltages. Hence, the reason for this slight increase in minimum actuation voltages at 250 nl could be attributed to larger ratio of wire surface area to droplet surface area.

To show that the z-axis actuation voltage itself did not affect the DNA that was being transported, the following experiment was done. Salmon sperm DNA was tagged with Cye5 dye (which emits at 632 nm). This sample was placed in a 1×SSC buffer solution. 500 nl of this fluid was stamped using the electrostatic actuation method of the present invention, as well as pipetting. The pipetting was done as a control for the experiment. If the DNA stamped using both methods showed similar results when scanned, there would be strong evidence to show that the actuation mechanism itself does not affect the binding of DNA to the substrate receiving the stamped samples.

To keep the environment similar in both cases, the array plate used in pipetting stamping was smeared with silicone oil. A 500 nl droplet containing fluorescently tagged DNA in 1×SSC buffer was stamped using both the methods on different slides. The droplet was stamped in a 2 Cst oil bath using a gap height of 590 $\mu$m. The slides were allowed to air-dry overnight, and were then scanned using a GENEPRO® microarray scanner (commercially available from Genyous, Inc., Portland, Oreg.). Scanned images of a spot generated by electrostatic stamping were compared to the scanned images of the control sample. As previously indicated, the stamp of the control sample was done manually with a pipette. The conditions were otherwise identical to the electrostatically stamped array. The footprints of the stamped spots for both the DNA sample and the control sample were nearly circular. Moreover, the respective intensities, sizes, as well as shapes of the spots for the two samples were very similar. It was therefore demonstrated that the present invention in practice had no adverse effect on the DNA sample.

It will be understood that various details of the invention may be changed without departing from the scope of the invention. Furthermore, the foregoing description is for the purpose of illustration only, and not for the purpose of limitation—the invention being defined by the claims.

What is claimed is:

1. An apparatus for actuating a droplet by electrowetting, comprising:
   (a) a first conductive layer comprising an array of control electrodes covered by a first hydrophobic insulator surface;
   (b) a second conductive layer comprising a second conductive layer surface facing the first hydrophobic surface, the second conductive layer spaced from the first conductive layer to define a gap therebetween, and having an actuation voltage thereon of 40 to 50 volts;
   (c) a wire traction system comprising at least one conductive elongate wire element disposed in the gap between the first and second conductive layers and comprising a second hydrophobic surface, and having a voltage thereon less than the second conductive layer actuation voltage; and
   (d) a voltage source communicating with the second conductive layer and the elongate wire element that provides an actuation voltage to the second conductive layer of 40 to 50 volts, wherein the droplet is caused to move along a pathway extending around the conductive elongate wire element and from the first conductive layer towards the second conductive layer.

2. The apparatus according to claim 1 comprising a second voltage source communicating with the control electrodes and the elongate element.

3. The apparatus according to claim 1 wherein the first conductive layer comprises a planar body, and the first hydrophobic surface is disposed on the planar body.

4. The apparatus according to claim 3 wherein the planar body comprises a glass.

5. The apparatus according to claim 3 wherein the first conductive layer comprises a conductive material disposed on the planar body, and the first hydrophobic surface is disposed on the conductive material.

6. The apparatus according to claim 5 wherein the conductive material comprises a metal.

7. The apparatus according to claim 5 wherein the conductive material comprises indium tin oxide.

8. The apparatus according to claim 5 wherein the first conductive layer comprises a dielectric material disposed on the conductive material, and the first hydrophobic surface is disposed on the dielectric material.

9. The apparatus according to claim 8 wherein the dielectric material comprises a parylene composition.

10. The apparatus according to claim 1 wherein the first hydrophobic surface comprises a hydrophobized region of the first conductive layer.

11. The apparatus according to claim 1 wherein the first hydrophobic surface comprises a hydrophobic layer disposed on the first conductive layer.

12. The apparatus according to claim 11 wherein the hydrophobic layer comprises polytetrafluoroethylene (PTFE).

13. The apparatus according to claim 1 wherein second conductive layer comprises a planar body, the planar body comprises an outer surface opposing the hydrophilic surface, and a conductive backing is disposed on the outer surface.

14. The apparatus according to claim 13 wherein the planar body comprises a derivatized glass.

15. The apparatus according to claim 13 wherein the conductive backing comprises a metal.

16. The apparatus according to claim 13 wherein the conductive backing comprises indium tin oxide.

17. The apparatus according to claim 1 wherein the hydrophilic surface of the second conductive layer comprises a plurality of analyte-specific receptor sites.

18. The apparatus according to claim 17 wherein the first conductive layer comprises a plurality of control electrodes, and at least one of the control electrodes is aligned across the gap with a corresponding group of the receptor sites.

19. The apparatus according to claim 1 wherein the second hydrophobic surface comprises a hydrophobized region of the elongate element.

20. The apparatus according to claim 1 wherein the second hydrophobic surface comprises a hydrophobic layer disposed on the elongate element.

21. The apparatus according to claim 20 wherein the hydrophobic layer comprises polytetrafluoroethylene (PTFE).

22. The apparatus according to claim 1 wherein the elongate wire element comprises a metal-containing wire.

23. The apparatus according to claim 1 comprising a plurality of conductive elongate elements disposed in the gap.

24. The apparatus according to claim 1 comprising a spacer element, wherein the elongate element is supported by the spacer element.

25. The apparatus according to claim 1 comprising a container, wherein the first conductive layer, the second conductive layer, and the elongate element are disposed in the container.

26. The apparatus according to claim 25 comprising a filler fluid disposed in the gap between the first and second conductive layers.

27. The apparatus according to claim 1 comprising an electronic controller communicating with the voltage source.

28. The apparatus according to claim 1 wherein the elongate element is spaced from the first conductive layer at a distance of approximately 0.05 mm to approximately 2 mm.

29. The apparatus according to claim 1 wherein the second conductive layer surface is hydrophilic.

* * * * *